(12) United States Patent
Geier (10) Patent No.: US 11,839,941 B2
(45) Date of Patent: Dec. 12, 2023

(54) HOLDING DEVICE FOR AN ABUTMENT BLANK

(71) Applicant: BIOMET 3I, LLC, Palm Beach Gardens, FL (US)

(72) Inventor: Andreas Geier, Gargazon (IT)

(73) Assignee: BIOMET 3I, LLC, Palm Beach Gardens, FL (US)

( * ) Notice: Subject to any disclaimer, the term of this patent is extended or adjusted under 35 U.S.C. 154(b) by 228 days.

(21) Appl. No.: 17/180,162

(22) Filed: Feb. 19, 2021

(65) Prior Publication Data
US 2021/0260707 A1    Aug. 26, 2021

Related U.S. Application Data

(60) Provisional application No. 62/979,389, filed on Feb. 20, 2020.

(51) Int. Cl.
*B23Q 1/03*    (2006.01)
(52) U.S. Cl.
CPC .................................. *B23Q 1/03* (2013.01)
(58) Field of Classification Search
CPC ...... A63C 13/12; A63C 13/0022; B23Q 3/061
See application file for complete search history.

(56) References Cited

U.S. PATENT DOCUMENTS 11,020,832 B2 *   6/2021   Geier .................... B23Q 3/062
2009/0275000 A1 *  11/2009   Jung .................. A61C 13/0004
                                                     433/223

FOREIGN PATENT DOCUMENTS

| KR | 101334524 | 11/2013 |
| WO | 2016085077 | 6/2016 |
| WO | 2017211427 | 12/2017 |

OTHER PUBLICATIONS

"European Application Serial No. 21158140.0, Extended European Search Report dated Jul. 2, 2021", 7 pages.

* cited by examiner

*Primary Examiner* — Tyrone V Hall, Jr.
(74) *Attorney, Agent, or Firm* — Sheridan Ross P.C.

(57) ABSTRACT

According to one example, a holding device system including a two-part holding frame having a blank holder coupled to a main frame is disclosed. The two-part holding frame can define a processing space and a fixation space. The holding device system can further include at least one fixation element having a head positioned within the fixation space and a threaded shaft extending within and engaged with a bore of the two-part holding frame. In one example, when the blank holder is coupled to the main frame, the at least one fixation element is unable to be removed from the two-part holding frame.

20 Claims, 6 Drawing Sheets

HOLDING DEVICE FOR AN ABUTMENT BLANK

CLAIM OF PRIORITY

This application claims the benefit of U.S. Provisional Patent Application Ser. No. 62/979,389, filed on Feb. 20, 2020, the benefit of priority of which is claimed hereby and incorporated by reference herein in its entirety.

FIELD

The present invention relates to a holding device and, in particular, to holding devices for holding abutment blanks during milling.

BACKGROUND

A dental implant (referred to herein as "implant") is implanted into an alveolus when a tooth is lost or damaged. Dental implants allow for lost or damaged teeth to be replaced without sacrificing adjacent teeth. An artificial tooth (e.g., a crown) attached to the dental implant functions like a natural tooth. For example, the artificial tooth looks and feels like a natural tooth and allows a patient to speak clearly after an operation, while quickly improving a patient's oral health.

A general overall implant comprises a fixture embedded in the gum, an abutment fixed to the fixture (e.g., by using a screw), and a crown fixed onto the abutment so as to give an external form of an artificial tooth. In this case, the abutment supports the crown. The artificial tooth is modeled individually, so that it replaces the original tooth with as much fidelity to the original as possible and it fits within the existing natural teeth. For optimal seating and optimal shaping of the artificial tooth, the abutment can also be adjusted individually. For example, depending on the existing oral anatomy (anatomy of the mouth), the patient's existing natural teeth, the location and orientation of the implanted dental implant, or to hold the abutment in a certain position, the abutment can be adjusted. Thus, in certain instances, customized abutments (i.e. patient-specific abutments) can be preferred to stock abutments having fixed sizes, shapes, and angulations.

OVERVIEW

Medical dentistry is a complex and demanding therapeutic discipline where both functionality and esthetics are required as are expected outcomes. The functionality and esthetics of an implant are related to the precise planning of the dental implant.

An abutment is affixed to the implant in a rotationally fixed position. The implant interface of the abutment provides the connection between the implant and the abutment. The implant interface establishes a form-fitting connection to the implant. In order to affix the abutment to the implant, generally a screw is inserted into the implant through a concentric borehole through the implant interface of the abutment. The screw can engage the implant and affix the abutment to the implant.

Abutments can be prepared individually and can be manufactured by a dental laboratory in each individual case. Abutment blanks, which already provide the implant interface (also known as the implant connection) are available for this purpose. This dental abutment blank is machined individually by the dental technician. However, the precision and accuracy to be achieved here are lower than what would be possible in industrial manufacturing. The interaction of implant and abutment is extremely important for the enduring stability of the artificial tooth, so the implant interface is prefabricated. The highest precision can therefore be maintained, so that extremely accurate seating of the abutment in the implant is ensured. The implant interface usually has connecting features, e.g., indexing outer contour, etc., and is usually specific for each implant manufacturer. It allows the abutment to be inserted into the implant in predetermined rotational positions.

The abutment blank can be machined to produce the individual abutment. For example, an emergence profile having a shoulder, which is adjacent to the implant interface, can be modeled. The individual abutment is adjoined to the emergence profile in the direction of the end facing away from the implant interface. It offers the supporting surface for the artificial tooth and corresponds essentially to the stump of a tooth.

For machining the abutment blanks, there are known devices in which the implant is simulated for retaining the blanks. Consequently, the retainer has a receptacle, which corresponds to the implant and into which the abutment blank with its implant interface can be inserted and retained. As a rule, the abutment blank is mounted on a so-called laboratory implant, which is in turn secured in the receptacle of the retainer. The blank and the laboratory implant are screwed together. This allows machining of the implant blank. Since the implant interface has an outer contour, which is usually an exterior hexagon head, the position of the blank in the retainer is crucial for the machining, in particular in the case of individually fabricated abutments. The machining may in general also take place in an automated process using machine tools or milling machines. Since the abutment blank is retained on the implant interface, the body of the blank can be machined in a position, in which it is freely accessible. This makes it possible to create an abutment tailored to the individual patient.

It has been found that in machining of the dental abutment blank, vibrations that exert forces on the implant connection (also referred to as the implant interface) occur when the blank is held on the implant connection. In this manner a high stress on the implant connection of the implant blank may occur with intense and extensive machining in the individual case and may even result in damage in the extreme case. It has been recognized that the implant connection of the abutment blank plays a crucial role in a satisfactory functioning of the abutment in the implant and therefore must not be damaged and must not be subjected to any forces in the machining of the abutment blank and in the production of the abutment. However, not coupling the abutment blank to a holder for milling via the implant connection can increase the difficulty of coupling the abutment blank to the holder. For example, additional components such as wrenches, etc., can be needed for attachment.

It is thus an object of the present invention to create a holder for a (dental) abutment blank, that does not couple to the implant connection and allows for easy coupling and decoupling.

According to one example, the present disclosure relates to a holding device system for holding an abutment blank. The holding device system can include a two-part holding frame having a main frame and a blank holder coupled to the main frame, the blank holder can define at least one fixation bore. In one example, the two-part holding frame defines a processing space and a fixation space, the processing space defined by a first portion of the main frame and a top surface of the blank holder and the fixation space defined by a second portion of the main frame and a bottom surface of the blank holder. The holding device system can include at least one fixation element having a head and a threaded shaft configured to engage with the at least one fixation bore. In one example, when the at least one fixation element is engaged with the blank holder, the head is positioned within the fixation space and the at least one fixation element can transition between a first floating position and a second engaged position. When the blank holder is coupled to the main frame, the at least one fixation element is unable to be removed from the blank holder. In one example, at the first floating position, a proximal end of the at least one fixation element can contact the main frame and a distal end of the threaded shaft is at least one of flush with the top surface of the blank holder or below the top surface of the blank holder. In an example, when the at least one fixation elements is at the second engaged position, a stop surface of the head of the at least one fixation element contacts the bottom surface of the blank holder and a portion of the threaded shaft extends beyond the top surface of the blank holder. The portion of the threaded shaft that extends beyond the top surface is configured to engage with the abutment blank.

According to another example, the present disclosure relates to a method for holding an abutment blank for machining. The method can include providing a two-part holding frame, including a blank holder coupled to a main frame. The two-part holding frame can define a processing space and a fixation space, where at least one fixation element has a head positioned within the fixation space and a threaded shaft extending within and engaged with a threaded bore of the blank holder. The method can include affixing the abutment blank to the two-part holding frame. In one example, affixing the abutment blank to the two-part holding frame includes positioning the abutment blank such that an engagement bore along a contact end of the abutment blank is aligned with the threaded bore of the blank holder, where the abutment blank can have an implant interface opposite the contact end. In on example, the method can include applying a rotational force to the head of the at least one fixation element such that the threaded shaft extends from the threaded bore of the blank holder and engages with the engagement bore of the abutment blank to affix the abutment blank to the two-part holding frame.

According to another example, the present disclosure relates to a holding device system for holding an abutment blank. The holding device includes a two-part holding frame, including a blank holder coupled to a main frame, the two-part holding frame defining a processing space and a fixation space. The holding device system can include at least one fixation element having a head positioned within the fixation space and a threaded shaft extending within and engaged with a threaded bore of the blank holder, the at least one fixation element configured to transition from a first floating position to a second engaged position. Where, at the first floating position, a distal end of the threaded shaft is at least one of substantially flush with the at least one fixation bore or recessed within the at least one fixation bore, and where, at the second engaged position, the distal end of the threaded shaft extends beyond a top surface of the blank holder to engage with the abutment blank.

These and other examples and features of the present systems will be set forth in part in the following Detailed Description. This Overview is intended to provide non-limiting examples of the present subject matter—it is not intended to provide an exclusive or exhaustive explanation.

The Detailed Description below is included to provide further information about the present systems.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various examples discussed in the present document.

DETAILED DESCRIPTION

The present application relates to a devices, systems, and methods for holding a dental component within a holding device for milling. For example, the present application relates to a holding device system for holding dental abutment blanks, a system including at least one abutment blank and a holding device for holding the dental abutment blank, and a method for retaining and machining an abutment blank.

While the present application is described herein mainly with reference to machining dental components, it should be understood that the present invention is not so limited. For example, the principles of the present invention can be applied to medical devices in general (e.g., implants, replacement joint parts, skeletal replacements, etc.) According to its broader examples, the present invention can apply to the milling or shaping of essentially any three-dimensional object.

In one example, the present application provides a holding device system for affixing a dental component (e.g., an abutment blank) for the manufacture of a dental component (e.g., abutment) in a housing of a milling unit. In one example, the holding device system can be used in any type of milling system, including, but not limited to, 5-axis or 6-axis milling machines.

In additional to abutments, examples of three-dimensional objects for manufacturing herein include, but are not limited to, dental articles, such as, a coping, pontic, framework, denture teeth, space maintainer, tooth replacement appliance, orthodontic retainer, denture, post, facet, splint, cylinder, pin, connector, crown, partial crown, veneer, onlay, inlay, bridge, fixed partial denture, and implant.

The term "abutment blank" is used herein to refer to all types of implant abutment structures affixed to the implant and between the implant and a crown or coping. The abutment blank can be a single, monolithic structure, or can be formed by more than one piece and will be milled, machined, or fabricated into a predetermined shape. Abutment blank as used herein refers to abutments blanks that either include or do not include the prefabricated implant interface geometry that mates with the implant.

The present application provides a holding device system that can retain/engage the abutment blank on a contact end (e.g., engagement section) that is spaced apart from the implant interface. In one example, the contact end is positioned distally from the implant interface. Whereas the industrially prefabricated implant connection is located on a first end of the body of the abutment blank, the contact end can be present on the body of the abutment blank at another location on the body of the blank spaced apart from the implant interface. In one example, the contact end is on a second end of the abutment blank, opposite the implant interface.

In one example, the implant interface can have a defined outer contour for defined seating in the implant. The outer contour may, for example, be in the shape of an outer hexagon or a polygon or any other shape that allows a defined orientation of the abutment. The defined orientation of the abutment and/or the construction part of the abutment with respect to the interface and/or the outer contour of the implant interface must be taken into account already in the production of the abutment from the blank. It has been recognized that a very precise and defined alignment is necessary for high-quality abutments, and the alignment has a great influence on the quality of the fit of the abutment and of the artificial tooth in the mouth. A faulty alignment or excessive tolerances cause incorrect seating in the mouth, so that the artificial tooth creates pressure on the neighboring teeth. Inaccurate seating facilitates the infiltration of bacteria between the tooth and the implant, which can cause inflammation and complaints in the patient.

Figure 1:
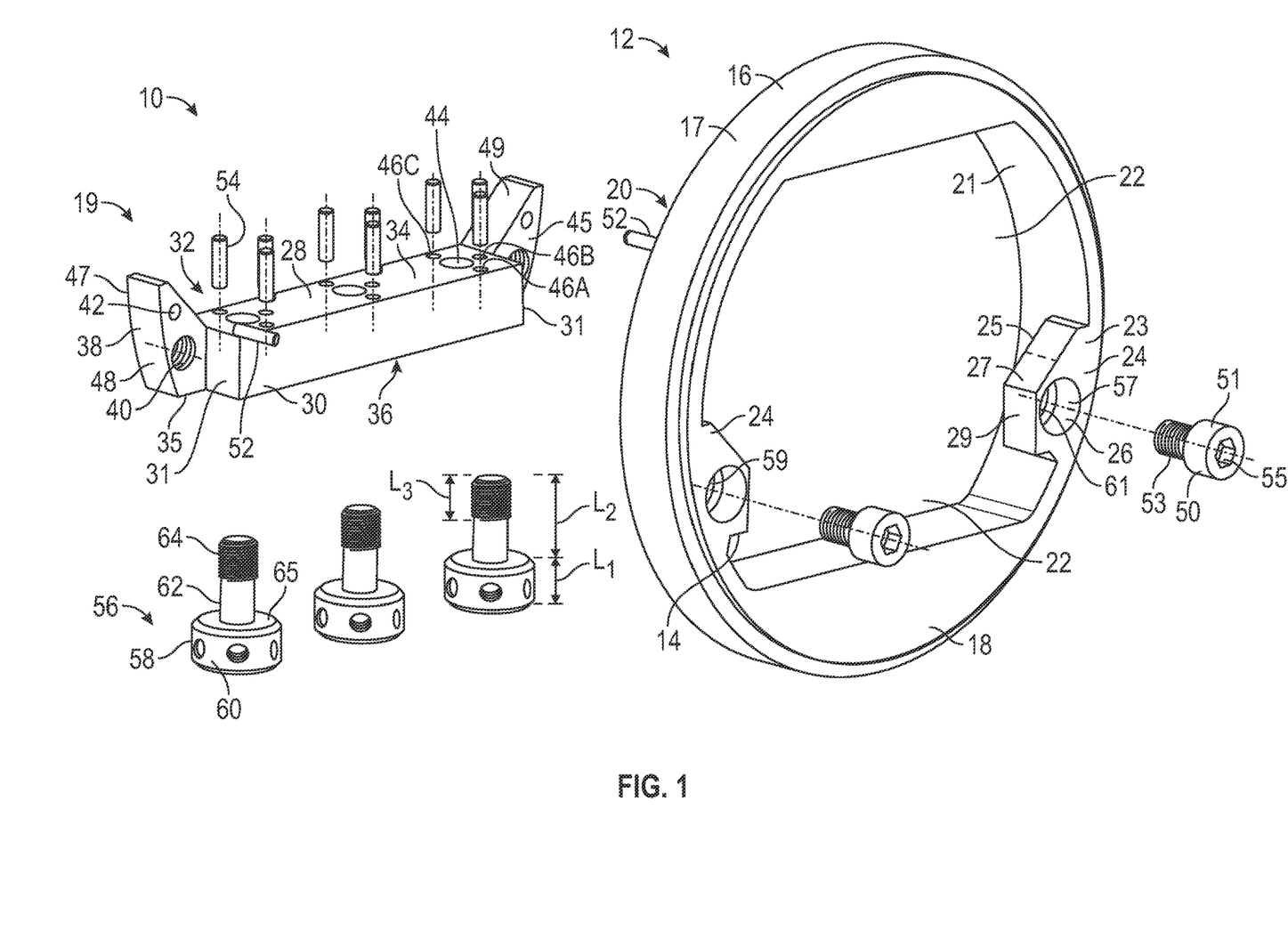
FIG. 1 is an expanded view of a holding device system, according to one example of the present disclosure.
Figure 2:
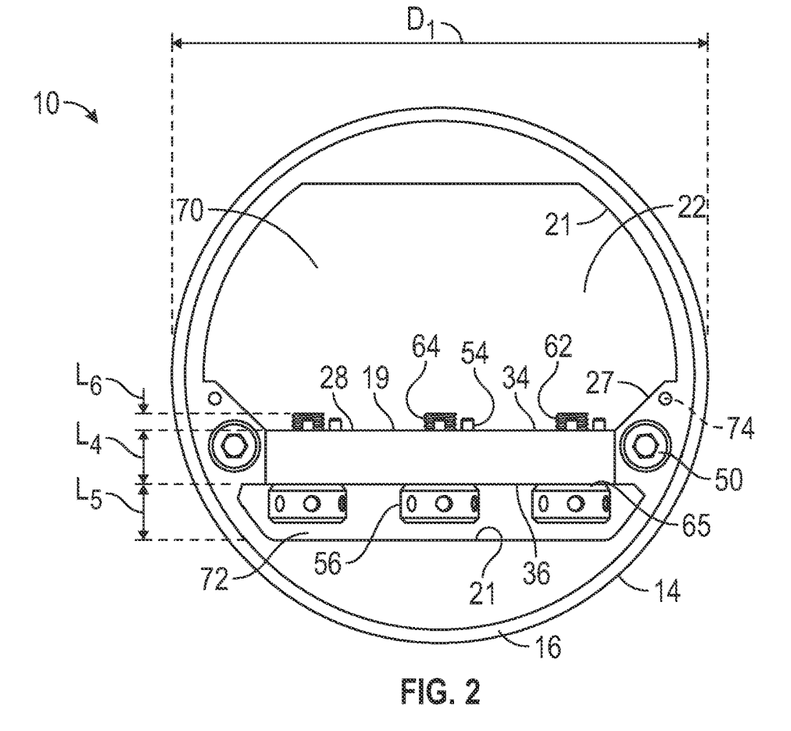
FIG. 2 is a front view of the holding device system of FIG. 1, according to one example of the present disclosure.
Figure 3:
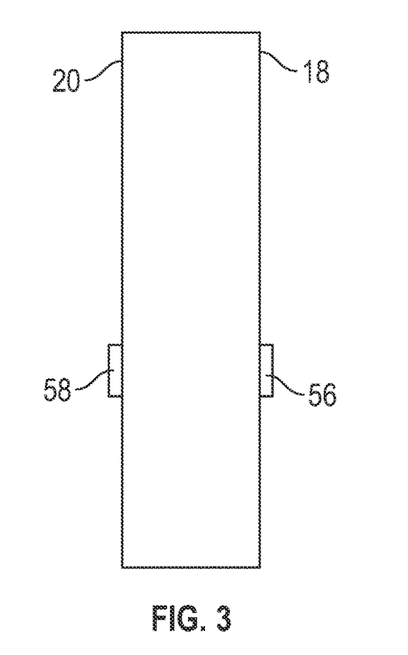
FIG. 3 is a side view of the holding device system of FIGS. 1 and 2, according to an example of the present disclosure.

FIGS. 1 through 4 illustrate a holding device system 10, in accordance with one example of the present disclosure. FIG. 1 illustrates an expanded view of a holding device system 10, FIG. 2 illustrates an assembled view of the holding device system 10, FIG. 3 illustrates a side-view of the assembled holding device system 10, and FIGS. 4A and 4B illustrate partial cross-sectional views of the assembled holding device system 10. Referring to FIGS. 1-4, the holding device 10 can include a two-part holding frame 12 and one or more fixation elements 56. As discussed herein, the one or more fixation elements 56 (also referred to herein individually as "fastener 56" and collectively as "fasteners 56"), can engage with abutment blanks to secure the abutment blanks to the holding device 10 for milling.

In one example, the two-part holding frame 12 can include a main frame 16 and an abutment blank holder 19 (also referred to herein as "blank holder 19"). The blank holder 19 can be coupled to the main frame 16 via fasteners 50. The main frame 16 can define an opening 22 that is configured to receive the blank holder 19.

The main frame 16 can have a disk-shaped form, such as shown in FIGS. 1-4. In one example, the external shape of the main frame 16 can be round. As discussed herein, the holding device system 10 can fit into a corresponding receptable of a standard disk holder (e.g., see FIG. 8) of a milling machine tool. However, the external shape of the main frame 16 can have other shapes such as a square, rectangle, diamond, triangle, etc., among others.

The main frame 16 includes a front surface 18, a back surface 20 opposite the front surface 18, and a connecting surface 17 connecting the front surface 18 and the back surface 20. The main frame 16 can have an inner surface 21 that defines an opening 22. The opening 22 is configured to receive, among other things, the blank holder 19.

In one example, the main frame 16 can include flanges 24 that extend inward from the inner surface 21 of the main frame 16. In one example, the flanges 24 have a front surface 23, a back surface 25 opposite the front surface 23, an upper surface 27, a bottom surface 14, and an inner surface 29. In one example, the front surface 23 can be substantially flush with the front surface 18 of the main frame 16. Each flange 24 can define an opening 26 configured to receive the fastener 50. For example, the fastener 50 can extend through the opening 26 and engage with a threaded bore 40 of the blank holder 19 to secure the blank holder 19 to the main frame 16.

In one example, the opening 26 can include a first portion 57 and a second portion 59. The first portion 57 can be a counterbore defining a shoulder 61. The second portion 59 can extend from the shoulder 61 to a back surface 25 of the flange 24. In one example, a thickness of the flange 24 can extend from the front surface 23 to a point along the inner surface 21 of the main frame 16. That is, the thickness of the flange 24 can be less than a thickness of the main frame 16 (i.e., the width of the connecting surface 17).

In one example, the fastener 50 can include a head 51 and a threaded shaft 53. The head 51 can define a blind bore 55 having a non-rotational shape that is configured receive a tool to rotate the fastener 50. The opening 26 in the main frame 16 can be configured to receive the fastener 50 such that head 51 can be received within the first portion 57 until the head 51 engages the shoulder 61 and the threaded shaft 53 can extend through the second portion 59 and engage with a portion of the threaded bore 40 of the blank holder 19.

In one example, the blank holder 19 includes a base 28 having a front surface 30, a back surface 32 opposite the front surface 30, a top surface 34, a bottom surface 36 opposite the top surface 36, and two opposing side surfaces 31. In one example, the blank holder 19 can include flanges 38 that extend outward from each side surface 31 of the base 28. The flanges 38 can define the threaded bore 40 configured to threadably engage fastener 51 to couple the blank holder 19 to the main frame 16. In one example, the flanges 38 can optionally include a bore 42 configured to receive pin 52. For example, one end of the pin 52 can be received in bore 42 of the blank holder 19 and the other end of the pin 52 can be received in a corresponding bore 74 (see bore 74 of FIGS. 2, 4A, and 4B) of the main frame 16. In one example, bores 74 and 42 can be blind bores.

The flanges 38 can have a front surface 45, a back surface 47 opposite the front surface 45, an upper surface 49, a bottom surface 35, and side surfaces 48. The back surface 47 of the flange 38 can be substantially flush with the back surface 32 of the base 28. In one example, the side surface 48 can have a shape that corresponds to a shape of a portion of the of the inner surface 21 of the main frame 16. When coupled to the main frame 16, the front surface 45 of the flange 38 of the blank holder 19 can contact the back surface 25 of the flange 24 of the main frame 15 and the side surfaces 31 of the base 28 can contact the inner surfaces 29 of the flanges 24 of the main frame 16.

In one example, a thickness of the flange 38 is substantially equal to the distance between the back surface 25 of the flange 24 to the back surface 20 of the main frame 16. Thus, when the blank holder 19 is coupled to the main frame 16, the back surface 47 of the flange 38 and the back surface 32 of the base 28 are substantially flush with the back surface 20 of the main frame 16. In one example, a thickness of the base 28 is substantially equal to the thickness of the main frame 16 (i.e., the thickness of the connecting surface 17). Therefore, when coupled to the main frame 16, the front surface 30 of the base 28 is substantially flush with the front surface 18 of the main frame 16 and the back surface 32 of the base 28 is substantially flush with the back surface 20 of the main frame 16.

The top surface 34 of the base 28 can be an engagement surface to engage with the abutment blanks, as discussed herein. The base 28 can include one more fixation bores 44 (referred to herein collectively as "bores 44" and individually as "bore 44") that extend from the top surface 34 to the bottom surface 36 of the base 28. In one example, the fixation bores 44 are threaded bores that are configured to engage with fixation elements 56. In another example, the fixation bores 44 are unthreaded. As illustrated, the top surface 34 includes three fixation bores 44. However, the number of fixation bores 44 can be dependent on size of the holding device 10 and can include more than three fixation bores 44 or less than three fixation bores 44.

In one example, the top surface 34 can include one or more pin holes 46A, 46B, and 46C (collectively referred to herein as "pin holes 46" or generally "pin hole 46"). As illustrated in the examples, the top surface 34 define three pin holes 46. The pin holes 46 are configured to receive pins 54, e.g., spring pins, that can engage positioning grooves (e.g., positioning grooves 104A-C in FIGS. 5A-C, 6, and 7) of an abutment blank (e.g., abutment blank 100 in FIGS. 5A-C, 6, and 7). As discussed herein, the orientation of the pin holes 46 algin with the positioning grooves 104A-C of the abutment blank 100 such that there is only one way to couple the abutment blank 100 to the holding device 10. Thus, the orientation and position of the abutment is known. In one example, the pin holes 46 can be blind bores. In one example, the pin holes 46 and the pins 54 can be formed separately. In another example, the pin holes 46 and the pins 54 can be formed integrally, such that they are a single integral unit. While the pin 54 orientation is used such that the position of the abutment blank 100 is known, the pins 54 are also used to prevent rotation of the abutment blank 100 during milling.

In one example, the holding device 10 can include fixation elements 56. The fixation elements 56 can include a head 58 and a shaft 62 extending from the head 58. The shaft 62 can include threads 64. The threads 64 can extend along a portion of the shaft 62 or along the entire length of the shaft 62. As seen in FIG. 1, the shaft 62 can have a length "L2" and the threads 64 along the shaft 62 can have a length "L3". In one example, "L3" is less than "L2". In another example, "L3" equals "L2". In one example, the head 58 can include a texture 60 that can improve the friction between a user and the head 58 of the fixation element 56.

The fixation elements 56 are configured to threadably engage fixation bores 44. That is, the threads 64 on the fixation elements 56 can engage threads of the fixation elements 56. As discussed herein, when fully engaged with the blank holder 19, a stop surface 65 of the head 58 engages the bottom surface 36 of the base 28. As seen in FIG. 2, when fully engages, a portion of the shaft 62 including the threads 64 extends beyond the top surface 34 of the base 28. As discussed herein, the portion of the shaft 62 extending beyond the top surface 34 has a length "L6" that is sufficient to engage a threaded bore of the abutment blank.

FIG. 2 illustrates the blank holder 19 coupled to the main frame 16. As discussed herein, prior to coupling the blank holder 19 to the main frame 16, the fixation elements 56 can be coupled to the blank holder 19. When the blank holder 19 is coupled to the main frame 16, the opening 22 is separated into two parts, a processing space 70 and a fixation space 72. The processing space 70 can be thus formed accessible from two sides, so that it is possible to use a mill to machine an abutment blank being coupled to the holding device system 10. The processing space 70 is the space above the blank holder 19 and can be defined by a portion of the inner surface 21 of the main frame 16, the upper surface 27 of the flanges 24, the upper surface 49 of the flanges 38, and the top surface 34 of the base 28. In one example, the fixation space 72 is accessible from two sides, so that a user can use their hand to apply a rotational force to the fixation elements 56 to move the fixation elements 5 relative to the blank holder 19 and main frame 16. In one example, as seen in FIG. 3, the head 58 of fixation elements 56 has a width that is greater than a width of the main frame 16. That is, the head 58 extends beyond the front surface 18 and the back surface 20 of the main frame 16. In one example, the head 58 of the fixation elements 56 are substantially flush with the front and back surfaces 18, 20 of the main frame 16. In another example, the width of the head 58 of the fixation elements 56 can be less than the width of the main frame 16 such that the head 58 is recessed within the main frame 16.

Referring back to FIGS. 1 and 2, the fixation space 72 can be below the blank holder 19 and can be defined by a bottom surface 36 of the base 28, a bottom surface 14 of the flanges 24, a bottom surface 35 of the flanges 38, and a portion of the inner surface 21 of the main frame 16. As discussed herein, a length "L5" of the fixation space 72 is less than the total length of the fixation element 56. That is, the length "L5" of the fixation space 72 is less than length "L1" of the head 58 plus length "L2" of the shaft 62 of the fixation element 56. Thus, once the blank holder 19 is coupled to the main frame 16, the fixation elements 56 are not able to be removed. As discussed herein, a length "L4" of the base 28 and the length "L5" of the fixation space 72 enable the fixation elements 56 to have two positions. A floating position (as seen in FIG. 4A) and an engaged position (as seen in FIG. 4B).

Figure 4A:
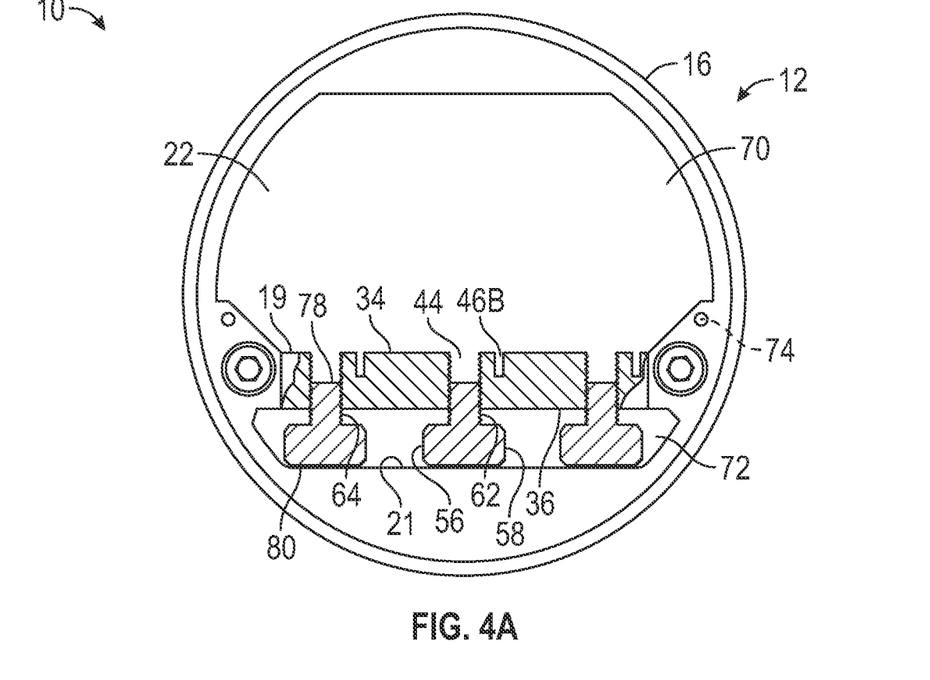
FIG. 4A is a partial cross-sectional view of the holding device system in FIGS. 1-3, where the fixation elements are in a floating position, according to one example of the present disclosure.
Figure 4B:
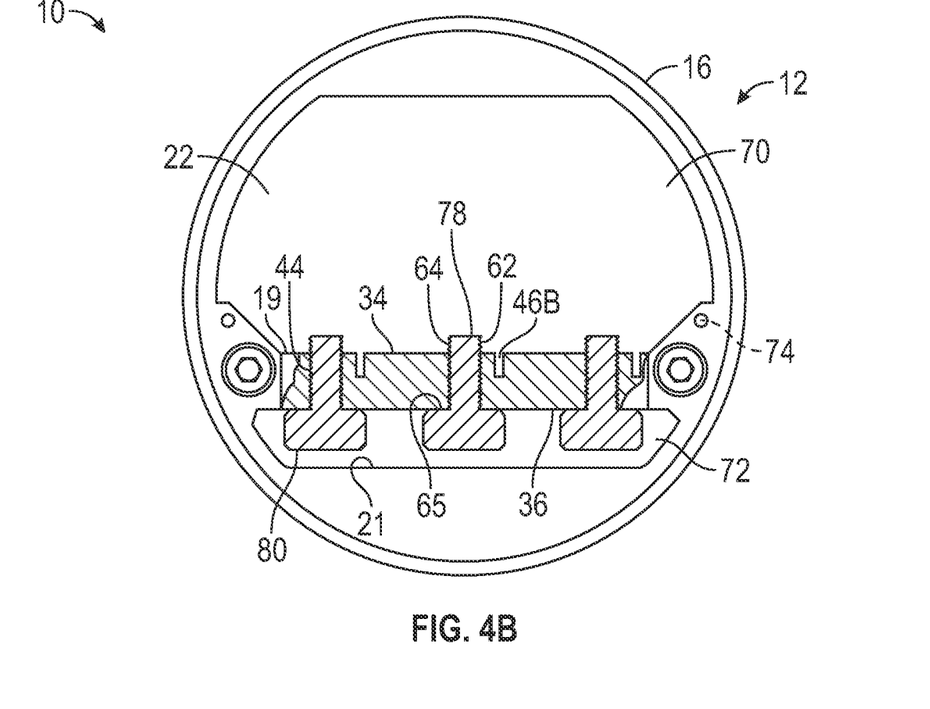
FIG. 4B is a partial cross-sectional view of the holding device system in FIGS. 1-3, where the fixation elements are in an engaged position, according to one example of the present disclosure.

FIGS. 4A and 4B illustrate partial cross-sectional views of a portion of the holding device system 10. FIG. 4A illustrates the fixation elements 56 in the floating position. In the floating position, the distal end 78 of the fixation elements 56 are substantially flush with the top surface 34 of the base 28 or are recessed within the bore 44. In the floating position, the fixation elements 56 do not engage with an abutment blank. That is, the threads 64 of the fixation elements 56 are substantially flush with or below the top surface 34 of the base 28. In one example, in the floating position, a proximal end 80 of the fixation element 56 can contact the main frame 16, e.g., along an inner surface 21 of the fixation space 72. However, in one example, the proximal end 80 can be spaced from the inner surface 21 of the main frame 16 while the distal end 78 of the shaft 62 is substantially flush with or below the top surface 34.

In one example where the bores 44 are unthreaded, the fixation elements 56 can freely move up and down relative to the blank holder 19. That is, linear movement applied to the fixation elements 56 can move the fixation elements 56 within and relative to the blank holder 19. In one example where the bores 44 are threaded, the fixation elements 56 can still move relative to the blank holder 19, but a rotational force would need to be applied to move the fixation elements 56 such that the threads on the fixation elements 56 engaged with the threads of the bore 44.

As seen in FIG. 4A, once the fixation elements 56 are coupled to the blank holder 19 and the blank holder 19 is coupled to the main frame 16, the fixation elements 56 are not able to be removed from the blank holder 19 unless the blank holder 19 is removed from the main frame 16.

FIG. 4B illustrates the fixation elements 56 in the engaged position. That is, the fixation elements 56 have been threaded into the bores 44 such that a portion of the shaft 62 including the threads 64 extends beyond a top surface 34 of the base 28 that is sufficient to engage with a threaded bore of an abutment blank. For example, the distal end 78 of the shaft 62 extends beyond the top surface 34 of the base 28. In one example, the stop surface 65 of the head 58 can engage a bottom surface 36 of the base 28 in the engaged position. However, in the engaged position, the portion of the threads 64 that extend beyond the top surface 34 is sufficient to engage and retain the abutment blank to the holding device system 10. This configuration allows a user to simply apply a rotational force to the fixation elements 56 (e.g., using their hand) to engage and disengage abutment blanks, thereby increasing the ease and time required for engaging and disengaging abutment blanks as well as minimizing the number of components, which can lead to extremely efficient manufacturing processes.

Figure 5:
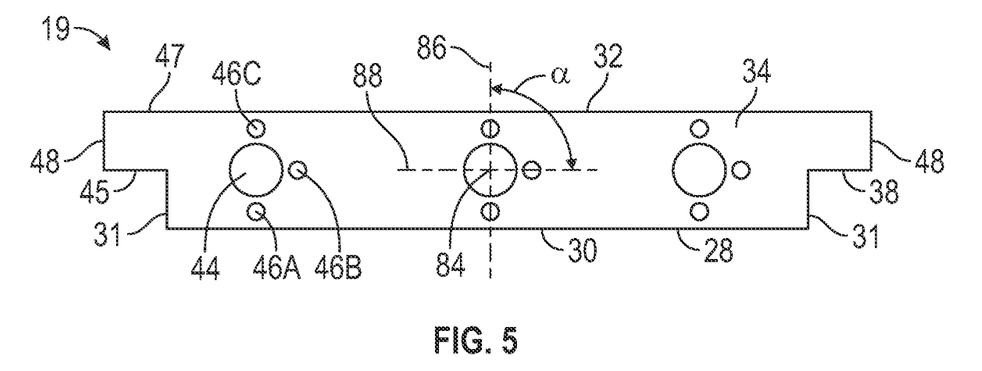
FIG. 5 is a top-down view of a blank holder of the holding device system, according to one example of the present disclosure.

FIG. 5 illustrates a top-down view of the blank holder 19. As illustrated in the example, three bores 44 are shown that are configured to engage with a corresponding abutment blank. However, more or less can be used.

The blank holder 19 can include a plurality of bores 44 so that the abutment blanks can be machined in one operation, for example. Automated machining of a plurality of blanks in parallel or in succession is possible in this manner without having to remove one abutment blank from the holding device before another abutment blank can be machined. Individual machining steps can also be carried out on a plurality of blanks before a further machining step is carried out.

In on example, the blank holder 19 can include at least one pin hole 46 that can receive a corresponding pin 54 (see FIG. 1). The at least one pin hole 46 and corresponding pin 54 can be used such that the orientation of the abutment blank is known, as well as provide anti-rotation support to the abutment blank. That is, the one or more pin holes 46 and pins 54 can provide additional support such that the abutment does not rotate during milling.

In one example, the pins 54 are separate from the blank holder 19 and can be inserted into the corresponding pin hole 46 positioned adjacent to one of the bores 44. In one example, the at least one pin 54 can be formed integral with the blank holder 19. That is, the blank holder 19 can be manufactured with one or more integral projections.

In one example, the blank holder 19 can include three pin holes, a first pin hole 46A, a second pin hole 46B, and a third pin hole 46C. As illustrated, the first and third pin holes 46A, 46C are positioned around a corresponding bore 44 such that a first and third pin hole 46A, 46C are diametrically opposed from each other about the bore 44. In an example, the second pin hole 46B can be positioned between and equidistant from the first and third pin holes 46A, 46C.

Figure 6A:
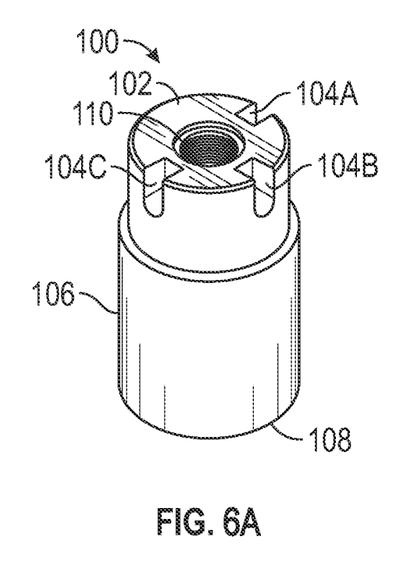
FIG. 6A is a perspective view of an abutment blank, in accordance with one example of the present disclosure.

In an example, a line 86 extending between the center of the first and third pin holes 46A, 46C and a center 84 of the bore 44 forms a right angle α with a line 88 that extends through the middle of the second pin hole 46B and intersects line 86 through the center 84. The orientation of the pin holes 46A-C correspond to the positioning grooves 104A-C of the abutment blank 100 (as seen in FIG. 5A) such that there is only one way to couple the abutment blank 100 to the blank holder 19. Other positioning of the one or more pin holes 46A-C is contemplated.

Figure 6B:
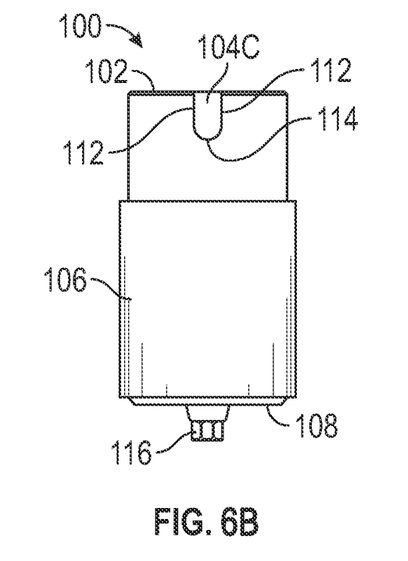
FIG. 6B is a side view of the abutment blank in FIG. 6A, in accordance with one example of the present disclosure.
Figure 6C:
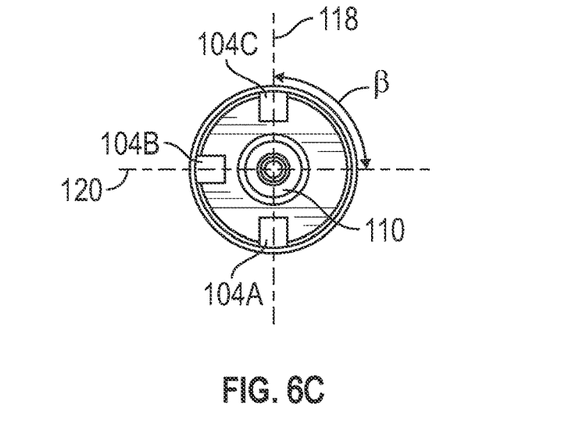
FIG. 6C is a top view of the abutment blank of FIGS. 6A and 6B, in accordance with one example of the present disclosure.
Figure 7:
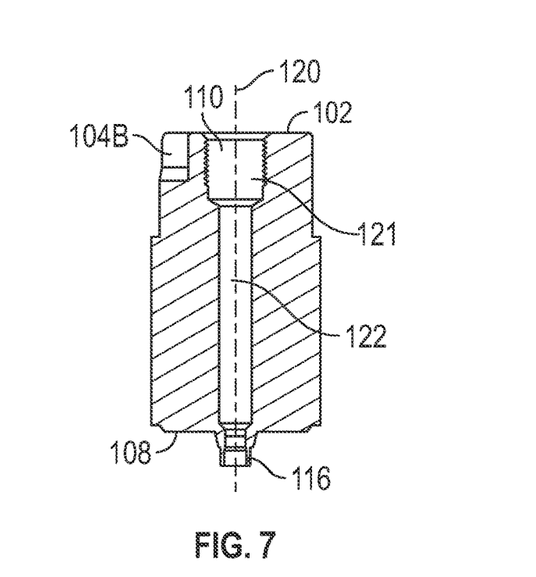
FIG. 7 is a cross-sectional view of the abutment blank, in accordance with one example of the present disclosure.
Figure 8:
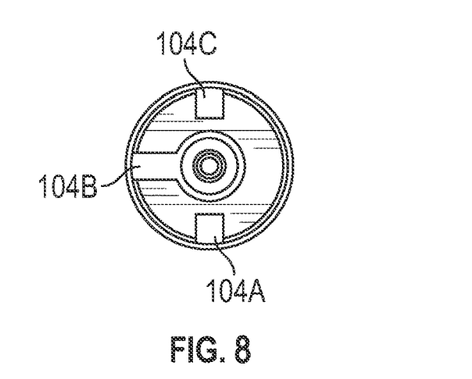
FIG. 8 is a top down view of an abutment blank, in accordance with one example of the present disclosure.

FIG. 6A is a perspective view of an abutment blank 100, FIG. 6B is a side view of the abutment blank 100 in FIG. 6A, and FIG. 6C is a top view of the abutment blank 100 of FIGS. 6A and 6B. FIG. 7 is a cross-sectional view of the abutment blank 100 along a longitudinal axis 120. FIG. 8 is another example of the abutment blank 100. In one example, the abutment blanks 100 (milling blanks) can be made of metal. For example, the abutment blanks 100 can be made of, but not limited to, titanium, stainless steel or cobalt chrome. However, other materials are also possible, for example, ceramics, plastics or the like.

The abutment blank 100 includes a body 106 extending from the contact end 102 to the implant engaging end 32. The contact end 102 defines at least one positioning groove 104 and an engagement bore 110. FIGS. 6A-C illustrate the abutment blank 100 including three positioning grooves 104A-C (collectively referred to herein as "positioning grooves 104" or generally "positioning groove 104"). By including at least one or more positioning grooves 104 that engages with pins (e.g., pins 54 in FIG. 1) on the blank holder 19 provides a system where there is only one position possible for coupling the abutment blank 100 to the blank holder 19. That is, e.g., with three positioning grooves 104A-C there is only one center point that can be accurately aligned and orientated with respect to the blank holder 19. For example, while one or two positioning grooves will provide alignment guidance, three positioning grooves can provide the most accurate alignment as well as anti-rotation properties.

The engagement bore 110 includes a threaded portion 121 and is configured to threadably engage with the threads 64 of the shaft 62 of the fixation element 56 (as shown in FIG. 1). The abutment blank 100 can also include an unthreaded bore 122 extending from the engagement bore threaded portion 121 to the implant engaging end 108. As seen in FIGS. 6B and 6C, the abutment blank 100 is coupled with the implant geometry 116. However, as discussed herein, the implant geometry 116 can be formed integral with the abutment blank 100 or as a separate component.

The positioning grooves 104 can include two flat surfaces 112 and a curved surface 114 connecting the two flat surfaces 112. In an example, the curved surface 114 can also be a flat surface. As seen in FIG. 6C, the positioning grooves 104 are positioned around the engagement bore 110 such that a first and a third positioning groove 104A, 104C are diametrically opposed from each other and a second positioning groove 104B is positioned between and equidistant from the first and second positioning grooves 104A, 104C. In an example, a line 118 extending between the center of the first and third positioning grooves 104A, 104C forms a right angle β with a line 120 that intersects line 118 and extends through the middle of the third positioning groove 34B.

As illustrated in FIGS. 6A and 6C, the positioning grooves 104 extend from an outer surface of the abutment blank 100 toward the engagement bore 100 but are not in communication with the engagement bore 100. However, FIG. 8 illustrates another example of the abutment blank 100 where at least one of the positioning grooves extends from the outer surface to the engagement bore 110 such that the engagement bore 100 and the positioning groove (e.g., positioning groove 104B are in communication.

Figure 9:
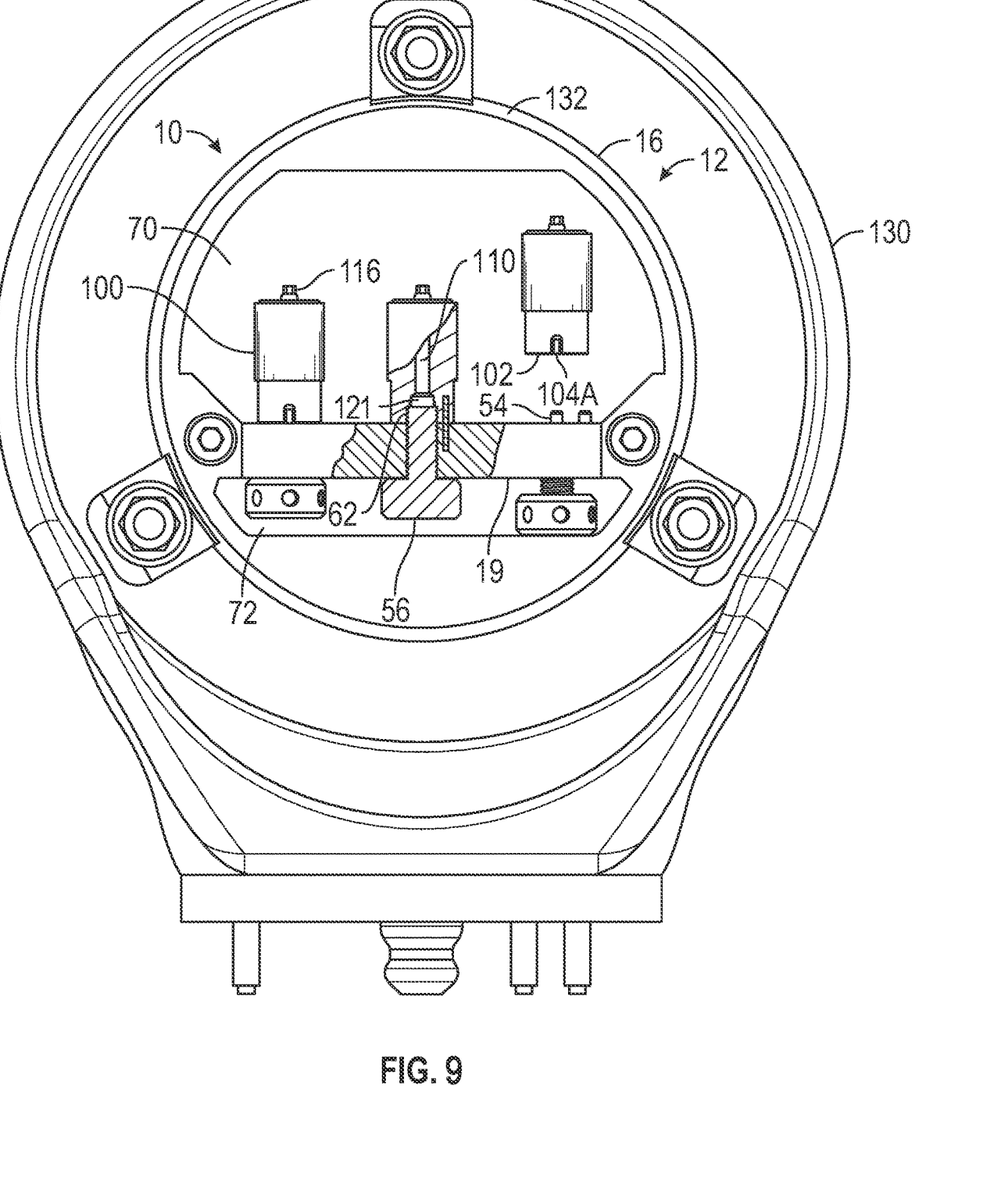
FIG. 9 is a partial cross-sectional view of the holding device system coupled in a corresponding receptacle of a machining tool, in accordance with one example of the present disclosure.

FIG. 9 illustrates the holding device system 10 coupled to a milling machine tool 132 (e.g., a standard disk holder). For example, the holding device system 10 can fit into a corresponding receptable 132 of a standard disk holder 132 of a milling machine tool 130. As discussed herein, the holding device system 10 allows the abutment blank 100 to be held in a rotationally secure manner in a predefined position to allow machining of the abutment blank 100, e.g., by a machine in an automated process. In retaining the abutment blank 100, the implant interface 116 of the abutment blank 100 is spaced apart from the blank holder 19. The abutment blank 100 is therefore affixed to the blank holder 19 in such a manner that the implant connection 116 (i.e., the implant interface) does not have a direct link or any contact with the holding device system 10.

As illustrated in FIG. 9, the holding device system 10 can hold or retain three abutment blanks 100, so that they can be machined in one operation. That is, the automated machining of a plurality of abutment blanks 100 in parallel or in succession is possible in this manner without having to remove one abutment blank 100 from the holding device system 10 before another can be machined. Individual machining steps can also be carried out on a plurality of blanks before a further machining step is carried out.

As illustrated in FIG. 9, the holding device system 10 defines the processing space 70, which is a machining area, into which the abutment blanks 100 that are coupled to the holding device system 10 extend at least partially. In one example, the processing space 70 is preferably accessible from at least two sides.

In an example, the abutment blanks 100 are coupled to the blank holder 19 via the fixation elements 56. For example, a portion of the shaft 62 extends into and engages the threaded portion 121 of the bore 110 of the abutment blank 110. The holding device system 10 and the abutment blank 100 have anti-rotation protection formed by the pins 54 that engage the blank holder 19 and the abutment blank 100. The anti-rotation protection with a very low tolerance and high precision can be created in particular through the use of a positioning grooves 104 and pins 54. Other coupling means corresponding to one another are also conceivable.

Since the abutment blank 100 is affixed to the holding device system 10 only at the contact end 102, which is spaced apart from the implant interface 116, no forces are exerted on the implant interface 116 during the machining of the abutment blank 100. As discussed herein, this implant connection 116 can be prefabricated industrially with a uniformly high precision and with minimal tolerances. Since the high precision of the implant connection 116 is important for a satisfactory and long-term functioning of the abutment in the implant in the patient's mouth, it is important that no forces be applied directly to the implant interface 116. This is ensured by the holding device system 100 of the present disclosure.

As seen in FIG. 9, the holding device system 10 with the affixed abutment blanks 100 can be inserted into a receptable 132 of a machine tool 130, e.g., a milling machine. In this way, abutments can be machined using traditional milling machines. The machining can be done by milling, turning, chipping or similar machining steps, for example, preferably in a fully or partially automated operation.

In one example, the holding device system 10 can be made of stainless steel. Other materials may of course also be used. In one example, the holding device system 10 can be made of, but not limited to, titanium and other materials such as plastics.

For individual production of an abutment from a dental abutment blank 100 (abutment blank), a plurality of steps can be carried out according to the invention. First, a holding device system 10 can be provided. The fixation elements 56 can be screwed into the bottom of the threaded bores 44 of the blank holder 19. In one example, the fixation elements 56 are inserted until a stop surface 65 abuts the blank holder 19. Once the fixation element 56 are coupled to the blank holder 19, the blank holder 19 can couple to the main frame 16 via pins 52 and fasteners 50. After coupling the blank holder 19 to the main frame 16, a user can apply a rotational force to the fixation elements 56 until the fixation elements 56 are in the floating position (see FIG. 4A). As discussed herein, once the blank holder 100 is coupled to the main frame 16, the fixation element 56 are unable to be removed from the blank holder 100 until the blank holder 19 is uncoupled from the main frame 16. Thus, the mechanism for coupling the abutment blanks 100 to the holding device system 10 are always retained within the holding device system 10.

Once the holding device system 10 is prepares, an abutment blank 100 can be held in a desired position. For example, a contact end 102 of the abutment blank 100 can be positioned about the blank holder 19 such that the positioning grooves 104 of the abutment blank 100 are aligned with and receive pins 54. This algins bore 110 of the abutment blank 100 and the threaded bore 44 of the blank holder 19. Thus, the abutment blank 100 is held in a desired position in a rotationally secure manner. The abutment blank 100 can now be further secured to the holding device system 10 by applying a rotational force to the fixation element 56 to transition from the floating position to the engaged position. As discussed herein, as the fixation element 56 rotates, a portion of the threads 64 along the shaft 62 will engage the threaded portion 121 of the bore 110 of the abutment blank 100.

After the one or more abutment blanks 100 are secured to the holding device system 10, the holding device system 10 can be coupled to a machine tool 130. The abutment blanks 100 can be coupled to the holding device system 10 prior to coupling with the machine tool 130 or after the holding device system 10 can been coupled to the machine tool 130.

The abutment blanks 100 can be milled until an abutment is formed. Once the abutment is formed, a user can apply rotational force to the fixation elements 56 to transition the fixation elements 56 from the engaged position to the floating position to release the newly formed abutment. In one example, once the abutment is removed from the holding device system 10, further machining of the abutment may take place, for example, by manual post-processing.

Alternatively, in another step of the method, the abutment is preferably released, i.e., separated, by a cut or by deep milling from the contact end 102 of the abutment blank 100. In this machining step, the abutment is separated from the contact end 102, so that it preferably falls out of the holding device system 10. It is preferably captured or picked up by a capture device, for example, by a collecting tray. The capture device may preferably also consist of a wire or a thin cable stretched between the holding device and the implant interface.

In the next machining step, the holding device system 10 is preferably released from the milling machine. The fixation elements 56 are transitioned to the floating position to release any remaining portions of the abutment blanks 100, which are possibly still being held in the holding device system 100. Once removed, the holding device system 10 can be used again for machining additional abutment blanks 100. The holding device may be cleaned before being reused.

In an example, when using a holding device system 10 capable of holding a plurality of abutment blanks 100, the abutment blanks 100 can be machined parallelly or sequentially by repeating individual steps. The individual method steps described above need not necessarily be carried out in the order described here.

As the abutment blank is held in the holding device system at the contact end opposite the implant connection, forces occur only on the contact end and no forces are transferred to the implant interface. The contact end itself is not used to produce the abutment. This yields the advantage that the high precision of the implant connection is retained because no forces are exerted on the implant connection. This ensures satisfactory and long-term functioning of the abutment in the implant. There is no physical stress or burden on the implant interface during the milling operation. Consequently, there cannot be any weakening of the permanent stability, durability or reliability of the abutment in the implant as a result of the production of the abutment from the abutment blank. Additionally, by retaining the fixation elements that couple with the abutment blanks within the holding device system, even when not engaging an abutment blank, the ease of use and efficiency of reloading the holding device system can be increased.

Various Notes & Examples

Example 1 can provide a holding device system for holding an abutment blank, comprising a two-part holding frame, including: a main frame; a blank holder coupled to the main frame, the blank holder defining at least one fixation bore, wherein the two-part holding frame defines a processing space and a fixation space, the processing space defined above a top surface of the blank holder and the fixation space defined below a bottom surface of the blank holder; and at least one fixation element having a head and a threaded shaft configured to extend through at least one fixation bore and couple with the abutment blank, wherein, when the at least one fixation element is engaged with the blank holder, the head is positioned within the fixation space and the at least one fixation element can transition between a first floating position and a second engaged position.

Example 2 can include, or can optionally be combined with the subject matter of Example 1, to optionally include where when the blank holder is coupled to the main frame, the at least one fixation element is unable to be removed from the blank holder.

Example 3 can include, or can optionally be combined with the subject matter of one or any combination of Examples 1 or 2 to optionally include where, at the first floating position, a proximal end of the at least one fixation element contacts the main frame and a distal end of the threaded shaft is positioned within the at least one fixation bore.

Example 4 can include, or can optionally be combined with the subject matter of one or any combination of Examples 1 through 3 to optionally include where, at the first floating position, the distal end of the threaded shaft is at least one of flush with the top surface of the blank holder or below the top surface of the blank holder.

Example 5 can include, or can optionally be combined with the subject matter of one or any combination of Examples 1 through 4 to optionally include where, at the second engaged position, a stop surface of the head of the at least one fixation element contacts the bottom surface of the blank holder and a portion of the threaded shaft extends beyond the top surface of the blank holder, the portion of the threaded shaft configured to engage with the abutment blank.

Example 6 can include, or can optionally be combined with the subject matter of one or any combination of Examples 1 through 5 to optionally include where the blank holder further includes at least one pin hole positioned adjacent to the at least one fixation bore, the at least one pin hole configured to receive a pin to engage with the abutment blank to rotationally affix the abutment blank to the blank holder.

Example 7 can include, or can optionally be combined with the subject matter of one or any combination of Examples 1 through 6 to optionally include where the at least one pin hole includes a first pin hole, a second pin hole, and a third pin hole, the first, second, and third pin holes are positioned around the at least one fixation bore.

Example 8 can include, or can optionally be combined with the subject matter of one or any combination of Examples 1 through 7 to optionally include where the first pin hole and the third pin hole are diametrically opposed from each other.

Example 9 can include, or can optionally be combined with the subject matter of one or any combination of Examples 1 through 8 to optionally include where the third pin hole is positioned between and equidistant from the first pin hole and the second pin hole.

Example 10 can include, or can optionally be combined with the subject matter of one or any combination of Examples 1 through 9 to optionally include the abutment blank having a body extending from a contact end to an implant engaging end, the abutment blank including at least one positioning groove and an engagement bore extending from the contact end toward the implant engaging end.

Example 11 can include, or can optionally be combined with the subject matter of one or any combination of Examples 1 through 10 to optionally include where the contact end is configured to engage the top surface of the blank holder and receive a portion of the at least one fixation element to couple the abutment blank to the two-part holding frame.

Example 12 can provide method for holding an abutment blank for machining, the method comprising: providing a two-part holding frame, including a blank holder coupled to a main frame, the two-part holding frame defining a processing space and a fixation space, wherein at least one fixation element has a head positioned within the fixation space and a threaded shaft extending within a bore of the blank holder; and affixing the abutment blank to the two-part holding frame, the affixing including: positioning the abutment blank such that an engagement bore along a contact end of the abutment blank is aligned with the bore of the blank holder, the abutment blank having an implant interface opposite the contact end; and applying a rotational force to the head of the at least one fixation element such that the threaded shaft extends from the bore of the blank holder and engages with the engagement bore of the abutment blank to affix the abutment blank to the two-part holding frame.

Example 13 can include, or can optionally be combined with the subject matter of one or any combination of Examples 1 through 12 to optionally include providing the two-part holding frame includes prior to coupling the blank holder to the main frame, inserting the threaded shaft of the one fixation element into the bore of the blank holder.

Example 14 can include, or can optionally be combined with the subject matter of one or any combination of Examples 1 through 13 to optionally include where, when the blank holder is coupled to the main frame, the at least one fixation element is unable to be removed from the blank holder.

Example 15 can include, or can optionally be combined with the subject matter of one or any combination of Examples 1 through 14 to optionally include where, when the blank holder is coupled to the main frame, the at least one fixation element can transition between a first floating position and a second engaged position.

Example 16 can include, or can optionally be combined with the subject matter of one or any combination of Examples 1 through 15 to optionally include where, at the first floating position, a distal end of the threaded shaft is at least one of substantially flush with the at least one fixation bore or recessed within the at least one fixation bore.

Example 17 can include, or can optionally be combined with the subject matter of one or any combination of Examples 1 through 16 to optionally include where, at the second engaged position, the distal end of the threaded shaft extends beyond a top surface of the blank holder to engage the abutment blank.

Example 18 can include, or can optionally be combined with the subject matter of one or any combination of Examples 1 through 17 to optionally include inserting the two-part holding frame into a corresponding receptacle of a machine tool, in particular a milling machine, and fastening the holding device in the corresponding receptacle; and machining a freely accessible machining section of the abutment blank within the processing space to produce an abutment.

Example 19 can provide a holding device system for holding an abutment blank, comprising: a two-part holding frame, including a blank holder coupled to a main frame, the two-part holding frame defining a processing space and a fixation space; and at least one fixation element having a head positioned within the fixation space and a threaded shaft extending within a bore of the blank holder, the at least one fixation element configured to transition from a first floating position to a second engaged position, wherein, at the first floating position, a distal end of the threaded shaft is at least one of substantially flush with the at least one fixation bore or recessed within the at least one fixation bore, and wherein, at the second engaged position, the distal end of the threaded shaft extends beyond a top surface of the blank holder to engage with the abutment blank.

Example 20 can include, or can optionally be combined with the subject matter of one or any combination of Examples 1 through 19 to optionally include where, when the blank holder is coupled to the main frame, the at least one fixation element is unable to be removed from the blank holder.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed:

1. A holding device system for holding an abutment blank, comprising:
    a two-part holding frame, including:
        a main frame;
        a blank holder received in an opening of the main frame and coupled to the main frame, the blank holder defining at least one fixation bore, wherein the two-part holding frame defines a processing space and a fixation space, the processing space defined above a top surface of the blank holder and the fixation space defined below a bottom surface of the blank holder and inside the opening of the main frame; and
    at least one fixation element having a head and a threaded shaft configured to extend through the at least one fixation bore and couple with the abutment blank,
    wherein, when the at least one fixation element is engaged with the blank holder, the head is positioned within the fixation space and the at least one fixation element can transition between a first floating position in which the at least one fixation element does not engage with the abutment blank and a second engaged position.

2. The holding device system of claim 1, wherein, when the blank holder is coupled to the main frame, each of the at least one fixation element is unable to be removed from the blank holder.

3. The holding device system of claim 1, wherein, at the first floating position, a proximal end of the at least one fixation element contacts the main frame and a distal end of the threaded shaft is positioned within the at least one fixation bore.

4. The holding device system of claim 1, wherein, at the first floating position, a distal end of the threaded shaft is at least one of flush with the top surface of the blank holder or below the top surface of the blank holder.

5. The holding device system of claim 1, wherein, at the second engaged position, a stop surface of the head of the at least one fixation element contacts the bottom surface of the blank holder and a portion of the threaded shaft extends beyond the top surface of the blank holder, the portion of the threaded shaft configured to engage with the abutment blank.

6. The holding device system of claim 1, wherein the blank holder further includes at least one pin hole positioned adjacent to the at least one fixation bore, the at least one pin hole configured to receive a pin to engage with the abutment blank to rotationally affix the abutment blank to the blank holder.

7. The holding device system of claim 6, wherein the at least one pin hole includes a first pin hole, a second pin hole, and a third pin hole, the first, second, and third pin holes are positioned around the at least one fixation bore.

8. The holding device system of claim 7, wherein the first pin hole and the third pin hole are diametrically opposed from each other.

9. The holding device system of claim 8, wherein the second pin hole is positioned between and equidistant from the first pin hole and the third pin hole.

10. The holding device system of claim 8, further including:
    the abutment blank having a body extending from a contact end to an implant engaging end, the abutment blank including at least one positioning groove and an engagement bore extending from the contact end toward the implant engaging end.

11. The holding device system of claim 10, wherein the contact end is configured to engage the top surface of the blank holder and receive a portion of the at least one fixation element to couple the abutment blank to the two-part holding frame.

12. A method for holding an abutment blank for machining, the method comprising:
    providing a two-part holding frame, including a blank holder coupled to a main frame defining an opening configured to receive the blank holder, the two-part holding frame defining a processing space defined above a top surface of the blank holder and inside the opening of the main frame and a fixation space defined below a bottom surface of the blank holder and inside the opening of the main frame, wherein at least one fixation element has a head positioned within the fixation space and a threaded shaft extending within a bore of the blank holder; and
    affixing the abutment blank to the two-part holding frame, the affixing including:
        positioning the abutment blank such that an engagement bore along a contact end of the abutment blank is aligned with the bore of the blank holder, the abutment blank having an implant interface opposite the contact end; and
        applying a rotational force to the head of the at least one fixation element such that the threaded shaft extends from the bore of the blank holder and engages with the engagement bore of the abutment blank to affix the abutment blank to the two-part holding frame.

13. The method of claim 12, wherein providing the two-part holding frame includes:
    prior to coupling the blank holder to the main frame, inserting the threaded shaft of the one fixation element into the bore of the blank holder.

14. The method of claim 13, wherein, when the blank holder is coupled to the main frame, each of the at least one fixation element is unable to be removed from the blank holder.

15. The method of claim 12, wherein, when the blank holder is coupled to the main frame, the at least one fixation element can transition between a first floating position and a second engaged position.

16. The method of claim 15, wherein, at the first floating position, a distal end of the threaded shaft is at least one of substantially flush with the at least one fixation bore or recessed within the at least one fixation bore.

17. The method of claim 16, wherein, at the second engaged position, the distal end of the threaded shaft extends beyond a top surface of the blank holder to engage the abutment blank.

18. The method of claim 12, further including:
    inserting the two-part holding frame into a corresponding receptacle of a machine tool, in particular a milling machine, and fastening the two-part holding frame in the corresponding receptacle; and machining a freely accessible machining section of the abutment blank within the processing space to produce an abutment.

19. A holding device system for holding an abutment blank, comprising:
a two-part holding frame, including a blank holder coupled to a main frame, the two-part holding frame defining a processing space and a fixation space; and
at least one fixation element having a head positioned within the fixation space and a threaded shaft extending within a bore of the blank holder, the at least one fixation element configured to transition from a first floating position to a second engaged position,
wherein, at the first floating position, a distal end of the threaded shaft is at least one of substantially flush with at least one fixation bore or recessed within the at least one fixation bore, and
wherein, at the second engaged position, the distal end of the threaded shaft extends beyond a top surface of the blank holder to engage with the abutment blank.

20. The holding device system of claim 19, wherein, when the blank holder is coupled to the main frame, the at least one fixation element is unable to be removed from the blank holder.

* * * * *

UNITED STATES PATENT AND TRADEMARK OFFICE
CERTIFICATE OF CORRECTION

PATENT NO. : 11,839,941 B2
APPLICATION NO. : 17/180162
DATED : December 12, 2023
INVENTOR(S) : Andreas Geier Page 1 of 1

It is certified that error appears in the above-identified patent and that said Letters Patent is hereby corrected as shown below:

In the Claims

At Column 18, Line 57, after the phrase "substantially flush with" delete --the-- therein.

Signed and Sealed this
Seventh Day of January, 2025

Derrick Brent
*Acting Director of the United States Patent and Trademark Office*